(12) United States Patent
Gravely, Jr. et al.

(10) Patent No.: US 8,836,988 B2
(45) Date of Patent: Sep. 16, 2014

(54) SYSTEM AND METHOD FOR UPDATING MEMORIES USED TO STORE INFORMATION IN A PRINTING SYSTEM

(75) Inventors: John Willoughby Gravely, Jr., Clayton, NC (US); Richard J. Stievenart, Sanford, NC (US); Michael Larkin Shelby, Cary, NC (US)

(73) Assignee: Static Control Components, Inc., Sanford, NC (US)

( * ) Notice: Subject to any disclaimer, the term of this patent is extended or adjusted under 35 U.S.C. 154(b) by 570 days.

(21) Appl. No.: 13/017,799

(22) Filed: Jan. 31, 2011

(65) Prior Publication Data

US 2012/0194868 A1 Aug. 2, 2012

(51) Int. Cl.
G06K 15/00 (2006.01)
G01F 1/12 (2006.01)
G03G 21/18 (2006.01)

(52) U.S. Cl.
CPC .................. *G03G 21/1889* (2013.01)
USPC .......................... 358/1.16; 702/100

(58) Field of Classification Search
CPC .................................. G03G 21/1889
USPC ........................................................ 702/100
See application file for complete search history.

(56) References Cited

U.S. PATENT DOCUMENTS

| 7,426,613 | B2 | 9/2008 | Booth | |
|---|---|---|---|---|
| 7,844,786 | B2 | 11/2010 | Booth | |
| 2006/0285395 | A1* | 12/2006 | Booth et al. | 365/185.33 |
| 2007/0250659 | A1 | 10/2007 | Booth | |
| 2008/0276048 | A1 | 11/2008 | Booth | |

* cited by examiner

*Primary Examiner* — Douglas Tran
*Assistant Examiner* — Justin Katzwhite

(57) ABSTRACT

Electronic systems, such as printing systems, often use components that have a memory. The integral memory can be used to store information about the component. In some printing systems this memory includes storing a portion that stores a value indicative of an amount of a consumable that has been used. Discloses is a method and system for updating a memory that is integral to a component within a printing system. The value stored in the memory can be read to determine an amount of a consumable used. Alternatively, when a specific value is stored in the memory the printing system can deactivate the component.

26 Claims, 11 Drawing Sheets

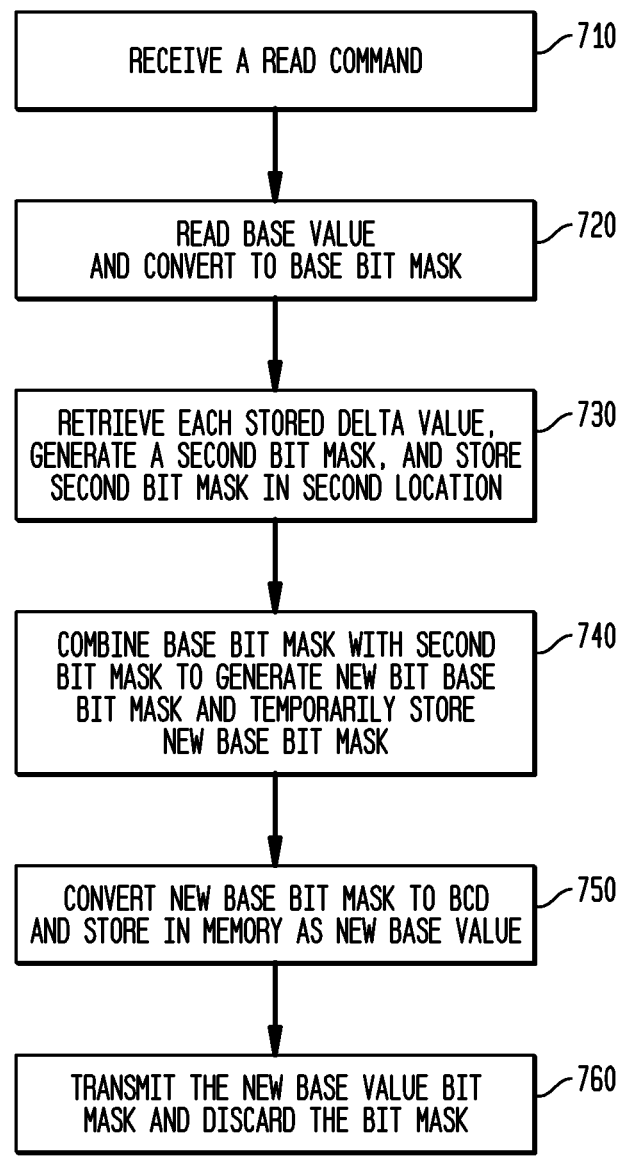

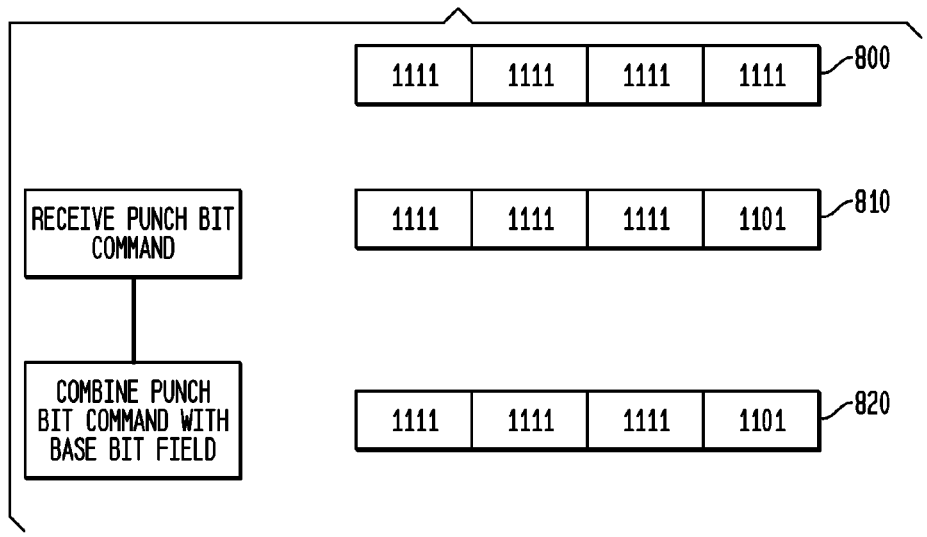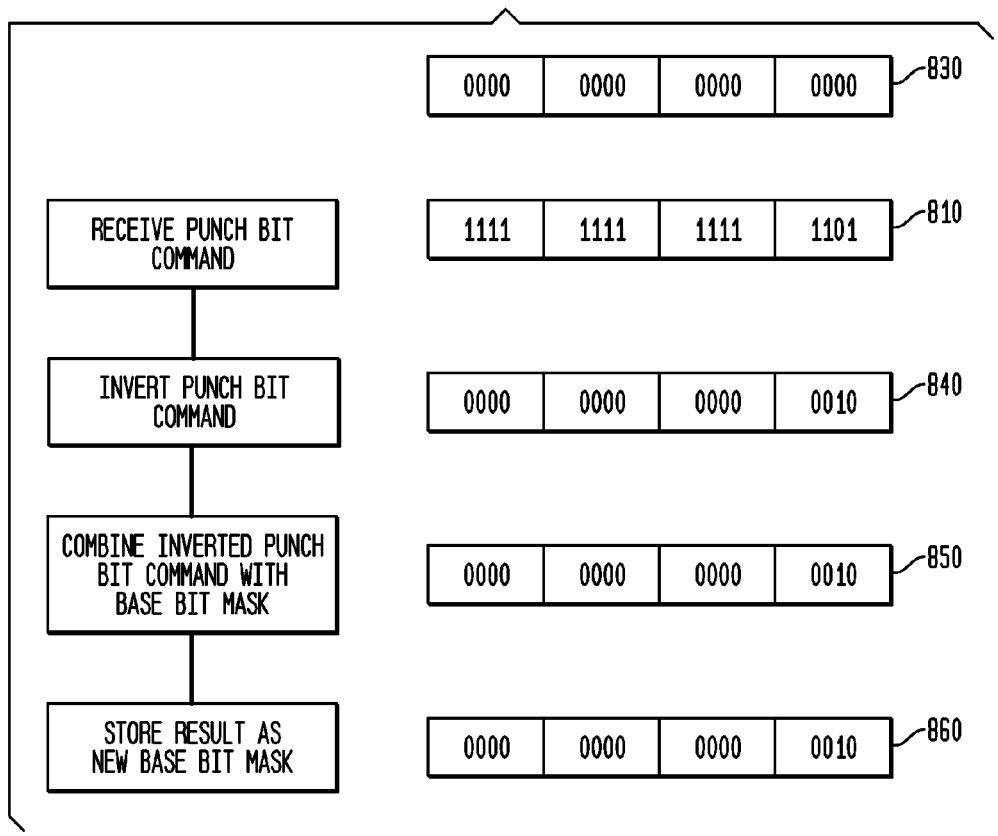

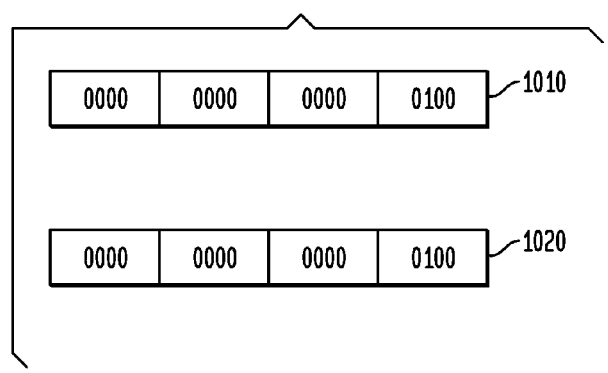

SYSTEM AND METHOD FOR UPDATING MEMORIES USED TO STORE INFORMATION IN A PRINTING SYSTEM

BACKGROUND

Many electronic devices have components that include an integrated memory. Often, the manufacturer of these devices wants to monitor usage to determine a remaining life of the device. One example of these devices is a printer having a memory on a printing cartridge.

Printers, such as inkjet printers or electrostatic printers, print an image on a recording medium by dispensing a printing medium onto the recording medium. Ink jet printers operate by ejecting ink drops from a printhead onto the recording medium. The printhead may contain one or more supplies of ink or be connected to separate ink cartridges that supply ink. Color images are formed by ejecting color inks onto the recording medium from one or more print heads. One printhead is used to eject black ink and a second printhead is used to eject color ink. Alternatively, each color ink may be ejected by single printhead. Electrostatic or laser printers form an image on a recording medium by transferring toner particles onto the medium. Typically, a recording drum is charged and a latent image is formed on the drum by a laser. The latent image is developed on the drum by developer or toner particles and this image is transferred directly or indirectly onto a recording medium. In color printers multiple cartridges are provided to transfer color images.

An example of an image recording device is described in U.S. Pat. No. 7,844,786. In this device, page counts recorded by non-volatile memory modules ("memory modules") may be incremented as pages are printed. Page counts may include the total number of pages printed by a printer and the total number of pages printed for each of a number of print categories. Recording the number of pages for individual print categories permits the recording of page counts for specific types of printing tasks, such as the total number of color pages, monochrome pages, letter size pages, legal size pages, transparencies, etc., that may be printed. In addition to recording page counts, non-volatile memory modules may be packaged with reservoirs such as ink or toner cartridges, and the memory modules may contain one or more bit fields for recording the depletion of the reservoirs. By comparison, each bit field may be in either an erased or programmed state (e.g., a "0" or "1") while each page count may include a plurality of bits representing a numeric value. As an example, a non-volatile memory module provided with a toner cartridge may contain thirty-two bit fields, and as a particular amount of toner has been depleted (e.g., 1/32 of the total toner), a bit field may be "punched out," thereby changing the bit field from an erased state to a programmed state. For instance, the value in the bit field may be changed from an initial value of "0" to a value of "1". In this illustrative example, all thirty-two bit fields may be punched out after all of the toner had been depleted, thereby signifying full depletion of the toner cartridge. It will be appreciated by one of ordinary skill in the art that imaging and printing devices may contain non-volatile memory modules that have one or more counts, resource bit fields, or a combination thereof.

A disadvantage of the method described above is that when a bit in a memory field is punched there may be a permanent change. Therefore, if a user desires to reuse, refill, or otherwise recycle the device, the permanent punched bits may prevent the device from operating properly. Also, the user may have other reasons to be able to change the information stored in the punch bit field.

Furthermore, original equipment manufacturers (OEMs) may utilize the punch bit field in order to prevent the use of cartridges made by other manufacturers. Also, the OEMs may use the punch bit field to try and prevent remanufacturers from recycling an old print cartridge. This may be done because the punch bit field can be set to indicate that a printer cartridge is in a condition where it is not presently useable such as: expired, out of ink or toner, unauthorized for a particular model, unauthorized for a particular brand, or unauthorized for a particular geographic region.

SUMMARY

The present system and method allows for a device receive a command signal to instruct the punching of a bit in a bit field without punching the bit. Instead, a value is generated that it is related to the bit to be punched and then stored. This allows for a user to alter the information stored in the memory and to reuse the memory device.

The present system and method also allows for a manufacturer to make a print cartridge that is useable in printer made by another manufacturer. Furthermore, the system and method allows for a remanufacturer to recycle or reuse an old print cartridge. This in turn prevents unnecessary waste by keeping functioning print cartridges from being discarded.

One method includes receiving, at one or more memory modules, a command transmitted from a processing device. The command indicates to the one or more memory modules to punch out a specified bit by changing the bit from an erased state to a programmed state. The method includes changing the specified from a programmed state to an erased state and transmitting acknowledgement that the bit has been punched.

The present system includes a printing system comprising at least one print cartridge having a memory with multiple storage locations and a communication path for providing command signals to the at least one print cartridge. A host device transmits command signals to the at least one print cartridge, the command signals include a punch bit command that indicates to the one or more memory modules to punch out a specified bit. A value indicative of a location of the specified bit is stored in the memory.

These and other features and objects of the invention will be more fully understood from the following detailed description of the embodiments, which should be read in light of the accompanying drawings.

In this regard, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings, which are incorporated in and form a part of the specification, illustrate embodiments of the present invention and, together with the description, serve to explain the principles of the invention;

FIG. 7 illustrates another embodiment for responding to a read command;

FIG. 8A illustrates a prior art method for responding to punch bit commands;

FIG. 8B illustrates an embodiment for responding to punch bit commands;

FIG. 9 illustrates an embodiment that uses gratuitous bits;

FIG. 10 illustrates an embodiment using a shadow array of bits;

DETAILED DESCRIPTION OF THE DRAWINGS

Figure 1:
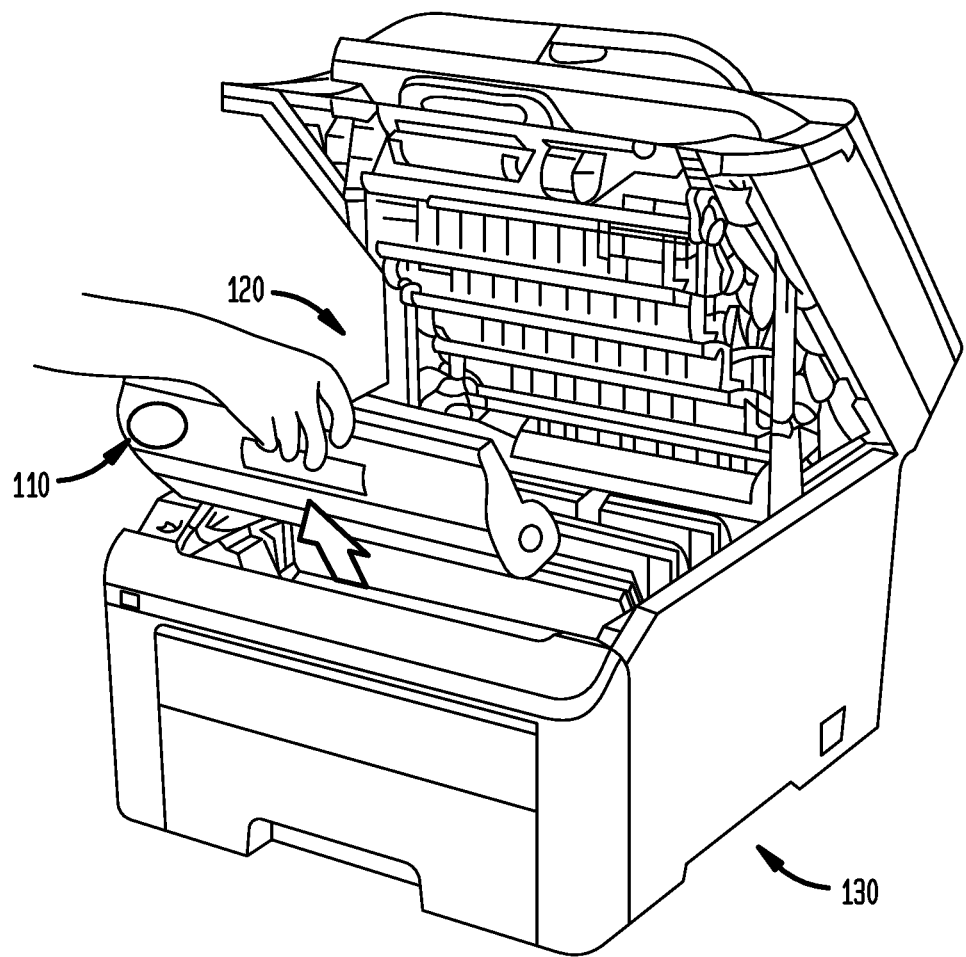
FIG. 1 illustrates a chip attached to a print cartridge.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

FIG. 1 illustrates the manner in which the chip 110 is itself attached to a toner cartridge 120 and interfaces with a processor 130 into which the cartridge 120 is inserted. The interface between the chip 110 and the processor 130, also may be known as an electronic handshake, may convey data between the chip 110 and the processor 130, allowing the processor 130 and the chip 110 to read data from and write data to each other. The communication across said interface serves to allow the processor to evaluate the suitability of the cartridge for use within the processor. The processor may signal an approval of the cartridge, in which case the cartridge may be used to dispense toner or ink within the processor. Alternately, the processor may deny the cartridge for use within the processor in which case the toner cartridge attached to the chip would not be permitted to dispense toner or ink within the processor.

Figure 2:
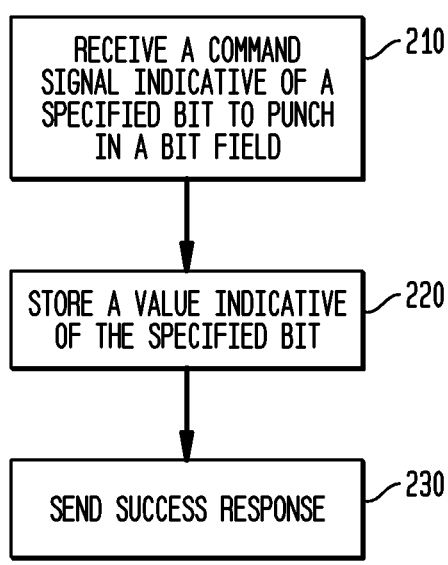
FIG. 2 illustrates an embodiment where values are stored in response to punch bit commands.

FIG. 2 illustrates a first embodiment. In this embodiment, a memory located on a removable device is updated in response to punch bit commands. A punch bit command is transmitted 210 from a processor or host unit in a host device, such as a printer. In an original equipment manufacturer (OEM) chip, the punch bit command indicates a specific bit to be punched. The OEM processes the punch bit command by punching the specific bit, typically from an erased state to a programmed state. Alternatively, the OEM chip may punch a bit by changing the specified bit from a programmed state to an erased state. In this embodiment, the chip provided does not punch a bit in response to receiving the punch bit command. Instead, a value is generated which is indicative of the specified bit. This value is stored in a portion of the memory 220. Then a success response is sent to the processor or host device 230. This allows for a non-OEM chip to be utilized in a OEM system that uses punch bit commands, without necessitating the permanent change to the memory associated with punching a bit. This process is described in further detail below.

The chip receives a command from the processor or another host device in the printer. The chip recognizes that the received command is a punch bit command. As described above, in the OEM chip the punch bit command would be processed by punching a specific bit in a bit field. The disclosed chip does not punch a bit in the bit field. Instead, the current chip determines a location of the bit that the punch bit command specifies to punch. A processor, located on the chip or in communication with the chip, determines a value that is representative of the bit to be punched. This value is written into a specific location of the memory which results in the chip having a memory with a value stored therein.

If the printer sends another punch bit command to the chip, the process described above is repeated. A value is determined that represents the location of the specific bit to punched, the value is written to a location in the memory, and the memory has an additional punch bit value stored therein.

When a read bit field command is received by the chip, the chip then uses all of the values stored in the memory locations to determine the location of all of the bits that would have been punched on the OEM chip. This information is used to generate a mask that resembles a bit field. The mask is then output to the processor (or host) located within the printer. This allows a chip other than an OEM chip to operate properly in the printer because the chip can properly respond to read commands requesting information on the punch bit field.

Figure 3:
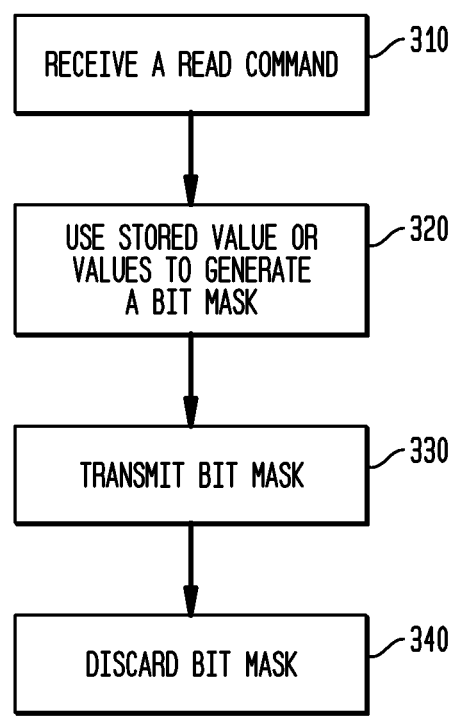
FIG. 3 illustrates responding to a read command in the embodiment illustrated in FIG. 2.

FIG. 3 illustrates the processing of a read command in the first embodiment. A read command is received at one or more memory modules on the chip 310. The one or more memory module uses the value stored to generate a bit mask 320. The bit mask 320 may be temporarily stored in a portion of the memory or in RAM and transmitted to the processor or host device 330. After transmission of the bit mask 320, the bit mask 320 is discarded from the memory or RAM 340.

Data used in the present application are values composed of individual bit that represent the state of the ink or toner cartridge. The value is also referred to as a base or as the base. The value may be stored as a plurality of binary coded decimal ("BCD") values along with individual bits that indicate changes in the individual binary coded decimal values. This will be described in further detail below in reference to FIG. 9.

The output data sent from the processor to the chip may include data to memorialize and convey a set of previous settings of the cartridge including but not limited to a permission setting and a status indicator. The permission would perform a query to produce a result to indicate whether the processor has approved the cartridge for use or whether the processor has denied the cartridge for use within the processor. This approval or denial would be saved to the memory within the chip in a non-volatile memory such that further attempts to use the cartridge within the processor would produce the same approval or denial result that occurred during the initial approval query.

Figure 4:
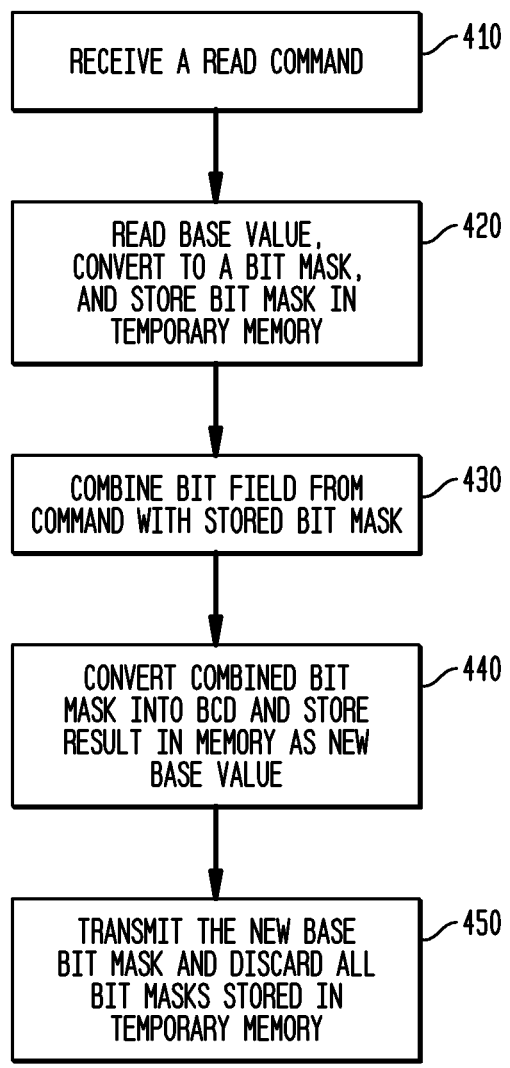
FIG. 4 illustrates an embodiment for responding to a read command.

FIG. 4 illustrates responding to a read command received by the chip from the printer or from a processor (or other device) within the printer. A read command is received from the printer 410. The chip reads the base value stored in the memory, converts the base value to a bit mask, and stores the bit mask in a temporary memory 420. The base value is a BCD value that is indicative of the bit field that would be stored on an OEM chip's memory. The temporary memory may be RAM or any other suitable type of memory. The bit field from the read command is combined with the stored bit mask 430 to produce a new base bit mask stored in temporary memory. This may be done in with a bit-wise AND or any other suitable method of combining the bit mask with the bit field. The combined bit mask is converted to BCD and the result is stored in memory as a new base value 440. The new base bit mask is transmitted and all of the temporarily stored bit masks are discarded 450.

In the above method, the base value may be stored in inverted BCD or stored in BCD. If the base value is stored in inverted BCD, then step 420 or step 430 would require inverting a value to obtain a proper combination. Also, step 440 would invert the combined bit mask before storing as the new base value.

Figure 5:
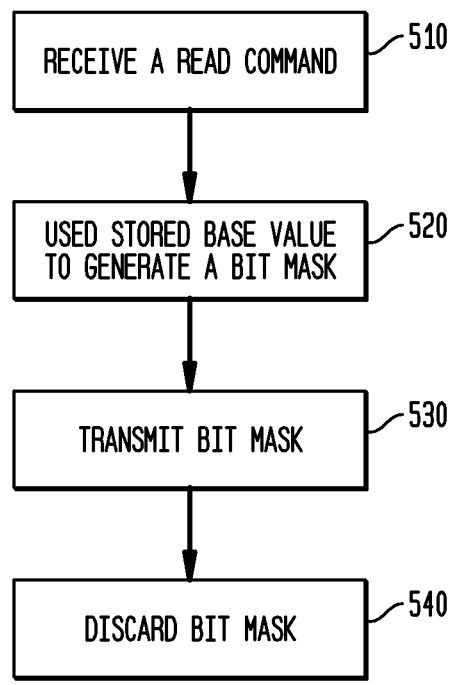
FIG. 5 illustrates another embodiment for responding to a read command.

FIG. 5 illustrates another method for responding to a read command received from the printer. A receive command 510 is received by the chip from a processor (or other device) within the printer. The chip uses the stored base value to generate a bit mask 520. The bit mask is transmitted to the processor (or other device) as the punch bit field 530. The bit mask is then discarded 540. This embodiment has the advantage of using less processing time and requires less frequent updating of the base value.

Figure 6:
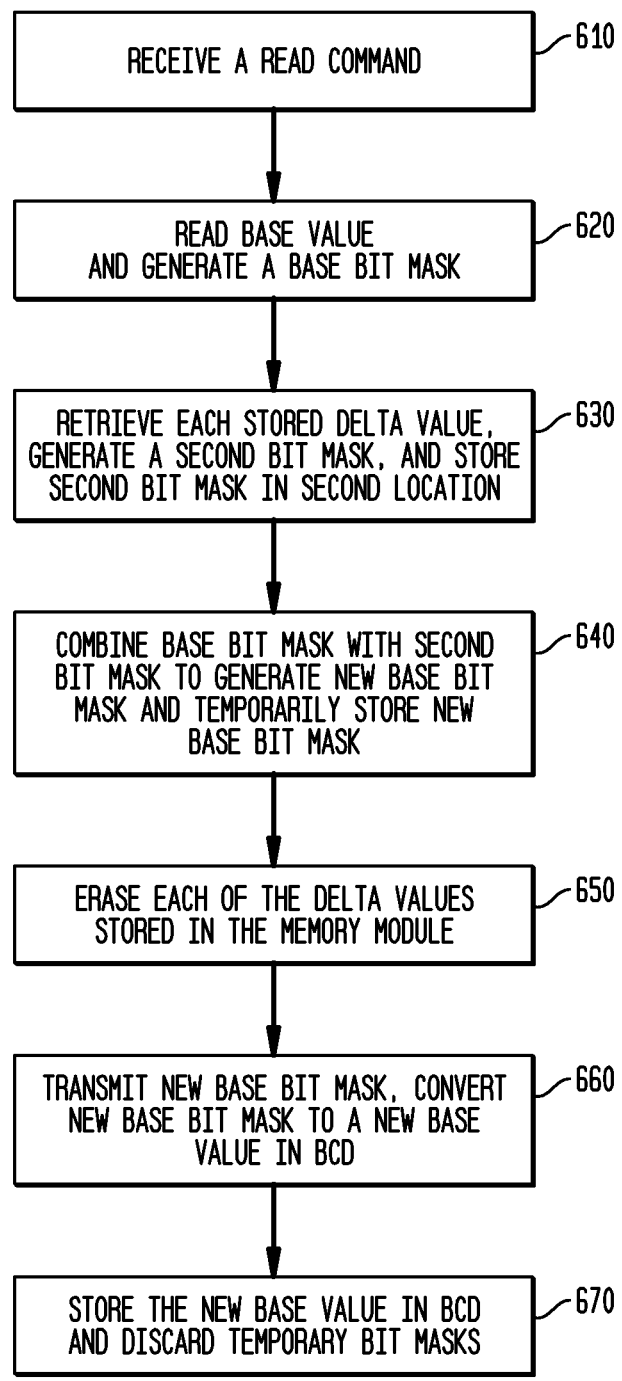
FIG. 6 illustrates another embodiment for responding to a read command.

FIG. 6 illustrates another embodiment which implements a read value command, wherein the delta values for a value to be read are collapsed and the resultant information is stored in an inverted binary coded decimal (BCD) representation. The base value representing the bit field is stored in BCD. The base value can be stored as is or inverted and then stored. In one example, each byte of the inverted data is stored as three nibbles of BCD digits, where each nibble uses 4 bits of memory. The total memory used to store the delta values is three nibbles of 4 bits each, which is 12 bits. Additional bits may be used for any other any other purpose needed. This implementation does not have to use a bit to indicate that a nibble has changed value. When an additional bit of memory is used to indicate that a nibble has or has not had the value changed, it is possible to use three additional bits total plus one unused bit, thus a total of 16 bits may be used. This is a commonly used data size in the art. Overall, the base value stored in BCD format will require 64 bits of storage. The implementations storage requirements are nearly twice the data storage requirements of implementations currently employed by the present state of the art. The method includes receiving a read command from a processor or host device 610. The base value stored in BCD is read from the memory module and used to generate a base bit mask 620. Each of the delta values stored in the memory module are retrieved, a second bit mask is generated, and the second bit mask is stored in temporary memory 630. The temporary memory may be RAM or any other suitable type of memory. The base bit mask is combined with the second bit mask to generate a new base bit mask and temporarily store the new base bit mask 640. Each of the delta values is erased 650. The new base bit mask is transmitted to the processor and converted to BCD as the new base 660. The new base is stored as the base value and all of the temporary bit masks are discarded 670.

In an alternative embodiment, the methods described above have an additional memory location. This additional memory location is used to store all of the temporary bit masks. These temporary bit masks then do not need to be discarded. These bit masks may be referenced later for a authorization check or any other purpose.

In the embodiment above, the memory required is significantly greater than the memory required for the prior art punch bit field. For example, if a bit filed is 32 bits long, this implementation needs 40 bytes of memory for each bit field.

The method described above is performed by a processor on the chip, or in communication with the chip, when a read command is received by the chip. The chip performs the method in order to properly respond to the read command without having punched in any bits in a punch bit field.

FIG. 7 illustrates another embodiment for responding to a read command. A read command is received by a memory module 710. The base value stored in the memory module is read 720 and used to generate a base bit mask. Each of the memory locations in the memory module is checked for a stored delta value, the stored delta values are retrieved and used to generate a second bit mask, and the second bit mask is stored at a second location 730. The base bit mask and the second bit mask are combined and temporarily stored as a new base bit mask 740. The new base bit mask is converted to a BCD value and stored in memory as the new base value 750. Step 750 does not have to be performed and may be omitted. The new base bit mask is transmitted to the host or a processor in the printer and all temporarily stored bit masks are discarded 760. In this embodiment none of the stored deltas are changed or erased. This embodiment allows for an implementation that updates the memory less frequently.

FIG. 8A illustrates an embodiment implementing an inverted bit method while FIG. 8A illustrates the prior art punch bit method. In the prior art a base value is stored 800. In this example the base value is 16 bits that are all initially set to all "1". The base value may be any desired length and may also be set to all "0". A punch bit command 810 is received from the printer to signal a change to be made to the stored bit field. The base bit field values 800 are combined using a bit-wise AND with the bit field indicated by the command 810 to produce the result 820, thus representing the end value 820. The end value 820 is then stored in the memory module. FIG. 8B illustrates one inverted bit embodiment where the start bit values 830 are initially set to all "0" (which is the inverse of the values used in the prior art). A punch bit command 810 is received from printer to signal a change to be made to the stored bit field. The bit field indicated by the punch bit command is inverted to result in an inverted punch bit mask 840. The inverted punch bit mask 840 is combined with the base bit mask 830. The combining may be performed using a bit-wise OR operation or using any other suitable operation. The combined bit mask is stored as the new base bit mask. In this embodiment, when the chip receives a read command, the stored base bit mask is inverted, output to the printer, and then kept in its original form.

Figure 8C:
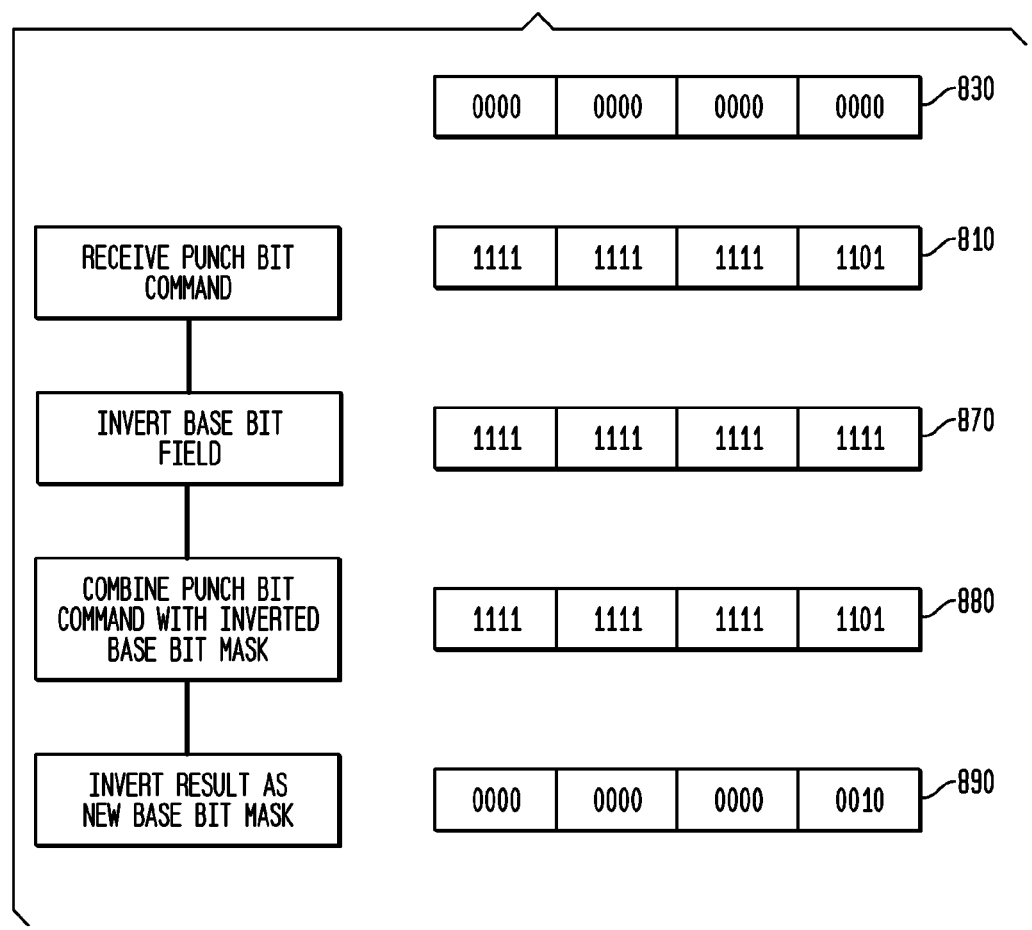
FIG. 8C illustrates another embodiment for responding to punch bit commands.

FIG. 8C illustrates another inverted bit embodiment where the starting bit mask values 830 are initially set to all "0" (which is the inverse of the values used in the prior art). The chip receives a punch bit command from the printer and the initial bit mask is inverted on a bit-by-bit basis to an inverted base bit mask 870 which is stored in temporary memory. The inverted base bit mask 870 is combined using a bit-wise AND with the bit field indicated by the command 810 to produce a result 880. The result 880 is then inverted by changing each bit to the exact opposite value from the result such that all zeros become ones and all ones become zeros, generating a new base value 890.

Alternatively, if the initial value 810 was set implemented to be set to all "1"s in the OEM chip, the present invention would set the initial value to be all "0"s. The method would then follow the steps indicated above to result in a chip that process punch bit command in the inverse manner than the OEM chip but is still useable by the OEM chip.

These two embodiments can be implemented in any sized bit field. For example, a bit field could be as small as one bit or as large as needed. A common implementation is to use a bit field of 32 bits.

In both of these embodiments, when the chip receives a read bit field command, the stored base bit mask is inverted (on a bit-by-bit basis) and transmitted as the bit field.

FIG. 9 illustrates an embodiment where a bit mask is stored in BCD and a gratuitous bit is used in response to a punch bit command. A byte can be represented in hexadecimal, decimal, or binary. As shown in FIG. 9, a byte of hexadecimal "FF" is equal to 255 in decimal or binary as 11111111. In order to store a byte in BCD, the decimal digits are each stored as a four bit binary number. For example, 255 is stored as a binary string 0010 0101 0101. Thus, a hex value of "FF" is stored as 001001010101 in BCD and there are four lead bits that are not used. When a punch bit command is received by the chip, the bit field indicated into converted to a BCD a value and stored in memory. Additionally, a leading bit may be set. The chip may set the same bit as indicated in the command, but, this is not equivalent to punching the bit.

FIG. 10 illustrates an embodiment using a shadow array of bits. In this embodiment, when the chip receives a punch bit command the chip responds by punching bits in a first bit field 1010 and a second bit field 1020. The second bit field operates as a shadow array of bits in that the printer does not except to receive information from more than one bit field. In an alternative embodiment, the second bit field 1020 may be an inverse of the first bit field 1010. In another alternative embodiment, the second bit field 1020 is used as a counter and the bits are punched sequentially to track how many punch bit commands have been received.

Figure 11:
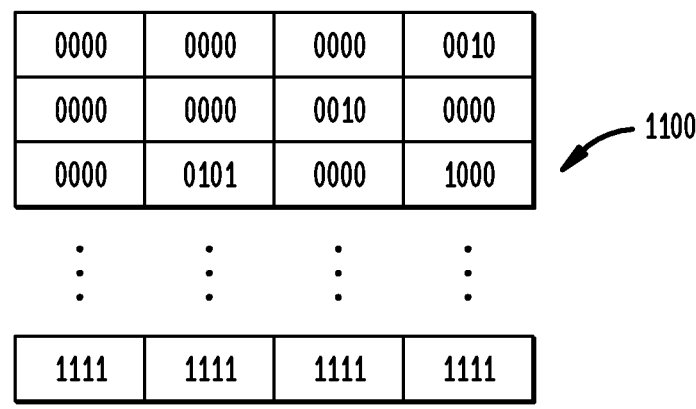
FIG. 11 illustrates an embodiment using a memory location for each possible bit field.

FIG. 11 illustrates an embodiment where each bit command is stored in a memory location. A memory area 1100 is provided which has an array of memory locations. When a punch bit command is received, the bit field indicated by the punch bit is stored as an entire bit field. When another punch bit command is received by the chip, the bit field indicated is stored in another memory location. Thus, memory 1100 will contain a bit string for each punch bit command that has been received from the printer. When the chip receives a read command, all of the stored bit strings are combined to determined a temporary punch bit string, the temporary punch bit string is outputted to the printer, and the temporary punch bit string is discarded. The punch bit strings can be combined using a bit-wise AND or by any other suitable operation. The temporary punch bit string may be stored in RAM or any other suitable type of memory.

The various components of the present application such as but not limited to the command, the memory module and the punched out bit, may be encrypted using a specific encryption algorithm or a unique encryption key. Such encryption would require a user of the present method to have a key compatible to the key employed by the party which encrypted the data. Encryption algorithms used may include, but are not limited to the RSA, DES/3DES, BLOWFISH, IDEA, SEAL and RC4 algorithms. An algorithm might also be specifically developed to implement the present application.

It is important to note that in all of the embodiments described herein, a chip on a removable device responds to commands received from a host device. In exemplary embodiments, the host device is an image recording device like a printer. The chip is located on a consumable device such as an ink cartridge or a toner cartridge. The chip receives commands from a processor in the printer. When the chip receives punch bit commands the chip responds by writing data into memory locations located on the chip. When the chip receives read commands, the chip responds to the read commands by presenting data generated from the written data. In this way, the chip is able to properly function in the host device without processing the punch bit commands in the method prescribed by the host device.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method of updating a memory module in an imaging device, comprising:
   receiving, at one or more memory modules, a command transmitted from a processing device, wherein the command indicates to the one or more memory modules to punch out a specified bit in a punch bit field; and
   storing a value in the one or more memory modules, wherein the value is stored in a plurality of bits located outside of the punch bit field and the value is indicative of a location of the specified bit in the punch bit field.

2. The method of claim 1, wherein the specified bit in the punch bit field is not punched.

3. The method of claim 1, wherein the command is indicative of usage of toner or ink in a consumable item in an imaging device.

4. The method of claim 1, wherein the value is stored in binary coded decimal.

5. The method of claim 1, wherein the value is stored in inverted binary coded decimal.

6. The method of claim 1 further comprising:
   receiving a read command signal; and
   outputting the value in response to the read command signal.

7. The method of claim 1, wherein a memory module is located on a Lexmark print cartridge.

8. The method of claim 1, wherein a memory module is located on a print cartridge that was manufactured by a first manufacturer and the print cartridge is designed to be utilized in a printer manufactured by a second manufacturer different than the first manufacturer.

9. The method of claim 1, wherein a memory module is located on a print cartridge that has been remanufactured.

10. The method of claim 1, wherein the memory module is located on a print cartridge that was manufactured by a first manufacturer and the memory module was manufactured by a second manufacturer different than the first manufacturer.

11. A method of updating a memory module in an imaging device, comprising:
    receiving, at one or more memory modules, a command transmitted from a processing device, wherein the command indicates to the one or more memory modules to punch out a specified bit in a punch bit field; and
    storing a decimal value in the one or more memory modules, wherein the decimal value is stored in a plurality of bits located outside of the punch bit field and is indicative of a location of the specified bit in the punch bit field.

12. The method of claim 11, wherein the decimal value is stored in an array in the one or more memory modules.

13. The method of claim 12, wherein the array is part of a non-volatile memory.

14. The method of claim 11, further comprising:
transmitting acknowledgement that the specified bit in the punch bit field has been punched even though the specified bit has not been punched.

15. The method of claim 11, wherein the command is indicative of usage of toner or ink in a consumable item in an imaging device.

16. A method of updating a memory module in an imaging device, comprising:
receiving, at one or more memory modules, a command transmitted from a processing device, wherein the command indicates to the one or more memory modules to punch out a specified bit in the memory module by changing the specified bit from an erased state to a programmed state;
changing the specified bit in the memory module from a programmed state to an erased state;
transmitting acknowledgement that the specified bit has been punched;
receiving a read command;
inverting the specified bit in the memory module;
transmitting the inverted specified bit; and
saving the original value for the specified bit.

17. The method of claim 16, wherein punching out the specified bit changes the specified bit from a "1" to a "0".

18. The method of claim 16, wherein the memory module is an imaging device and the command is indicative of usage of toner or ink in a consumable item in the imaging device.

19. A method of updating a memory module in an imaging device, comprising:
receiving, at one or more memory modules, a command transmitted from a processing device, wherein the command indicates to the one or more memory modules to punch out a specified bit by changing the specified bit from a programmed state to an erased state;
changing the specified bit from an erased state to a programmed state;
transmitting acknowledgement that the specified bit has been punched;
receiving a read command;
inverting the specified bit in the memory module;
transmitting the inverted specified bit; and
saving the original value for the specified bit.

20. The method of claim 19, wherein punching out the specified bit changes the specified bit from a "0" to a "1".

21. The method of claim 19, wherein the memory module is an imaging device and the command is indicative of usage of toner or ink in a consumable item in the imaging device.

22. A printing system comprising:
at least one print cartridge having a memory, wherein the memory includes multiple storage locations; and
a communication path for providing command signals to the at least one print cartridge, wherein a host device transmits the command signals to the at least one print cartridge, the command signals including a punch bit command that indicates to the one or more memory modules to punch out a specified hit in a punch bit field, wherein a value indicative of a location of the specified bit is stored in the memory in a plurality of bits located outside of the punch bit field.

23. The printing system of claim 22, wherein the memory has 32 bytes of memory allocated for storing values.

24. The printing system of claim 23, wherein the value is stored as a binary coded decimal.

25. The printing system of claim 23, wherein the value is stored as a binary coded decimal equivalent of an inverted value.

26. The printing system of claim 25, wherein each inverted value has one or more bytes and each byte is stored as three nibbles of binary coded decimal.

* * * * *